(12) United States Patent
Urade et al.

(10) Patent No.: US 11,174,438 B2
(45) Date of Patent: Nov. 16, 2021

(54) CONVERSION OF BIOMASS INTO A LIQUID HYDROCARBON MATERIAL

(71) Applicant: SHELL OIL COMPANY, Houston, TX (US)

(72) Inventors: Vikrant Nanasaheb Urade, Bengaluru (IN); Laxmi Narasimhan Chilkoor Soundararajan, Bangalore North (IN); Madhusudhan Rao Panchagnula, Bangalore North (IN); Alan Anthony Del Paggio, Spring, TX (US)

(73) Assignee: SHELL OIL COMPANY, Houston, TX (US)

( * ) Notice: Subject to any disclaimer, the term of this patent is extended or adjusted under 35 U.S.C. 154(b) by 180 days.

(21) Appl. No.: 15/757,607

(22) PCT Filed: Sep. 5, 2016

(86) PCT No.: PCT/EP2016/070872
§ 371 (c)(1),
(2) Date: Mar. 5, 2018

(87) PCT Pub. No.: WO2017/042129
PCT Pub. Date: Mar. 16, 2017

(65) Prior Publication Data
US 2018/0245000 A1 Aug. 30, 2018

(30) Foreign Application Priority Data
Sep. 7, 2015 (IN) .......................... 4737/CHE/2015

(51) Int. Cl.
*C10G 1/06* (2006.01)
*C10G 1/08* (2006.01)
(Continued)

(52) U.S. Cl.
CPC ............... *C10G 1/06* (2013.01); *C10G 1/086* (2013.01); *C10G 3/50* (2013.01); *C10K 1/002* (2013.01);
(Continued)

(58) Field of Classification Search
CPC . C10G 1/06; C10G 1/08; C10G 1/065; C10G 1/083; C10G 1/086
See application file for complete search history.

(56) References Cited

U.S. PATENT DOCUMENTS

| 5,468,372 A | 11/1995 | Seamans et al. |
| 5,688,736 A | 11/1997 | Seamans et al. |

(Continued)

FOREIGN PATENT DOCUMENTS

| CA | 1283880 C | 5/1991 |
| WO | 0047321 A1 | 8/2000 |

(Continued)

OTHER PUBLICATIONS

Bridgwater, "Biomass Fast Pyrolysis", Review paper BIBLID: 0354-9836, vol. 8, Issue No. 2, 2004, pp. 21-49.
(Continued)

Primary Examiner — Youngsul Jeong
(74) Attorney, Agent, or Firm — Shell Oil Company

(57) ABSTRACT

The present invention provides a process for producing liquid hydrocarbon products from a biomass, biomass containing and/or biomass-derived feedstock, said process comprising the steps of: a) contacting the feedstock with a first hydropyrolysis catalyst composition and molecular hydrogen in a first hydropyrolysis reactor vessel at a temperature in the range of from 350 to 600° C. and a pressure in the range of from 0.50 to 7.50 MPa, to produce a product stream comprising partially deoxygenated hydropyrolysis product, $H_2O$, $H_2$, $CO_2$, CO, $C_1$-$C_3$ gases, char and catalyst fines; b) (Continued)

removing said char and catalyst fines from said product stream; c) hydroconverting said partially deoxygenated hydropyrolysis product in a hydroconversion reactor vessel in the presence of one or more hydroconversion catalyst compositions and of the $H_2O$, $CO_2$, CO, $H_2$, and $C_1$-$C_3$ gas generated in step a), to produce a vapour phase product comprising substantially fully deoxygenated hydrocarbon product, $H_2O$, CO, $CO_2$, and $C_1$-$C_3$ gases, wherein one or more of the first hydropyrolysis catalyst composition and the hydroconversion catalyst composition is prepared by a process comprising combining a porous support with one or more catalytically active metals selected from Group VI and Group VIII of the Periodic Table, thereby forming a catalyst precursor having a volatile content, and reducing the volatile content of the catalyst precursor in one or more steps, wherein at least one volatile content reduction step is performed in the presence of one or more sulfur containing compounds; and wherein the catalyst precursor does not reach calcining temperatures prior to said at least one combined volatile content reduction-sulfurizing step.

19 Claims, 3 Drawing Sheets

(51) Int. Cl.
*C10K 1/00* (2006.01)
*C10K 3/04* (2006.01)
*C10G 3/00* (2006.01)

(52) U.S. Cl.
CPC ............... *C10K 1/004* (2013.01); *C10K 3/04* (2013.01); *C10G 2300/1014* (2013.01); *C10G 2300/202* (2013.01); *C10G 2300/207* (2013.01); *C10G 2300/703* (2013.01); *C10G 2300/708* (2013.01); *C10G 2400/02* (2013.01); *Y02P 30/20* (2015.11)

(56) References Cited

U.S. PATENT DOCUMENTS

| | | | |
|---|---|---|---|
| 5,961,786 | A | 10/1999 | Freel et al. |
| 6,218,333 | B1 | 4/2001 | Gabrielov et al. |
| 6,281,158 | B1 | 8/2001 | Gabrielov et al. |
| 6,290,841 | B1 | 9/2001 | Gabrielov et al. |
| 8,084,655 | B2 * | 12/2011 | Dindi ........................ B01J 23/78 585/240 |
| 10,174,259 | B2 * | 1/2019 | Urade ........................ C10K 3/04 |
| 2012/0095119 | A1 * | 4/2012 | Van Den Born .. B01D 53/1425 518/704 |
| 2013/0338412 | A1 * | 12/2013 | Marker ................... C10G 1/002 585/240 |
| 2014/0230317 | A1 * | 8/2014 | Liu ........................... C10L 1/02 44/307 |

FOREIGN PATENT DOCUMENTS

| | | | | |
|---|---|---|---|---|
| WO | 0232572 | A2 | 4/2002 | |
| WO | 2010117437 | A1 | 10/2010 | |
| WO | WO-2012162403 | A1 * | 11/2012 | ............... C10G 3/42 |
| WO | 2013054303 | A1 | 4/2013 | |
| WO | 2013064539 | A1 | 5/2013 | |
| WO | 2013068394 | A1 | 5/2013 | |
| WO | 2015114008 | A1 | 8/2015 | |

OTHER PUBLICATIONS

International Search Report and Written Opinion received for PCT Patent Application No. PCT/EP2016/070872, dated Nov. 23, 2016, 8 pages.

* cited by examiner

CONVERSION OF BIOMASS INTO A LIQUID HYDROCARBON MATERIAL

PRIORITY CLAIM

The present application is the National Stage (§ 371) of International Application No. PCT/EP2016/070872, filed 5 Sep. 2016, which claims priority from India Application No. 4737/CHE/2015, filed 7 Sep. 2015 incorporated herein by reference.

FIELD OF THE INVENTION

The invention relates to a process for converting a biomass-containing biomass-derived feedstock into a liquid hydrocarbon material suitable for use as a fuel or as a blending component in a fuel.

BACKGROUND OF THE INVENTION

With increasing demand for liquid transportation fuels, decreasing reserves of 'easy oil' (crude petroleum oil that can be accessed and recovered easily) and increasing constraints on the carbon footprints of such fuels, it is becoming increasingly important to develop routes to produce liquid transportation fuels from alternative sources in an efficient manner.

Biomass offers a source of renewable carbon and refers to biological material derived from living or deceased organisms and includes lignocellulosic materials (e.g., wood), aquatic materials (e.g., algae, aquatic plants, and seaweed) and animal by-products and wastes (e.g., offal, fats, and sewage sludge). Liquid transportation fuels produced from biomass are sometimes referred to as biofuels. Therefore, when using such biofuels, it may be possible to achieve more sustainable $CO_2$ emissions compared with petroleum-derived fuels.

However, in the conventional pyrolysis of biomass, typically fast pyrolysis carried out in an inert atmosphere, a dense, acidic, reactive liquid bio-oil product is obtained. This product contains water, oils and char formed during the process. The use of bio-oils produced via conventional pyrolysis is, therefore, subject to several drawbacks. These include increased chemical reactivity, water miscibility, high oxygen content and low heating value of the product. Often these products can be difficult to upgrade to fungible liquid hydrocarbon fuels.

An efficient method for processing biomass into high quality liquid fuels is described in WO 2010/117437 A1, in the name of Gas Technology Institute.

Solid feedstocks such as feedstocks containing waste plastics and feedstocks containing lignocellulose (e.g. woody biomass, agricultural residues, forestry residues, residues from the wood products and pulp & paper industries and municipal solid waste containing lignocellulosic material, waste plastics and/or food waste) are important feedstocks for biomass to fuel processes due to their availability on a large scale. Lignocellulose comprises a mixture of lignin, cellulose and hemicelluloses in any proportion and usually also contains ash and moisture.

The processes for the conversion of biomass into liquid hydrocarbon fuels described in WO 2010/117437 uses hydropyrolysis and hydroconversion catalysts. While not being limited to any particular catalyst, exemplary catalysts for use in such processes include sulfided catalysts containing nickel, molybdenum, cobalt or mixtures thereof as active metal(s). Other catalysts for use in the hydropyrolysis and hydroconversion steps for the conversion of biomass to liquid hydrocarbon fuels are described in co-pending applications PCT/EP2015/051709, IN 3235/CHE/2014, IN 3236/CHE/2014 and IN 3238/CHE/2014.

Highly active and stable, cobalt-containing hydrotreating catalysts are described in WO 2000/47321 and WO 2002/32572. These catalysts are produced using a combined volatile content reduction-sulfurizing step and are used for the hydrotreating of hydrocarbonaceous feedstocks.

Conventional hydrotreating catalysts are generally not considered to be suitable for the hydro-deoxygenation processes required to convert biomass-derived feedstocks into high quality liquid fuels due to the amount of water produced in the conversion and the detrimental effect this has on the catalysts, particularly on long-term stability in the presence of water.

It would be advantageous to develop a range of catalysts, applicable to the conversion of biomass-containing and/or biomass-derived feedstocks to liquid hydrocarbon fuels, such as the process described in WO 2010/117437, that provide increased activity, allow the application of milder process conditions and/or result in improved product quality. Such catalysts must prove resilient to the temperatures and other conditions used in this process. It would also be advantageous to develop a wider range of catalysts, applicable for use in such processes and adaptable to a broader range of biomass-containing and/or biomass-derived feedstocks.

SUMMARY OF THE INVENTION

Accordingly, the present invention provides a process for producing liquid hydrocarbon products from a at least one of a biomass-containing feedstock and a biomass-derived feedstock, said process comprising the steps of:
a) contacting the biomass-containing feedstock and/or biomass-derived feedstock with a first hydropyrolysis catalyst composition and molecular hydrogen in a first hydropyrolysis reactor vessel at a temperature in the range of from 350 to 600° C. and a pressure in the range of from 0.50 to 7.50 MPa, to produce a product stream comprising a partially deoxygenated hydropyrolysis product, $H_2O$, $H_2$, $CO_2$, CO, $C_1$-$C_3$ gases, char and catalyst fines;
b) removing all or a portion of said char and catalyst fines from said product stream;
c) hydroconverting all or a portion of said partially deoxygenated hydropyrolysis product in a hydroconversion reactor vessel in the presence of one or more hydroconversion catalyst compositions and of the $H_2O$, $CO_2$, CO, $H_2$, and $C_1$-$C_3$ gas generated in step a), to produce a vapour phase product comprising substantially fully deoxygenated hydrocarbon product, $H_2O$, CO, $CO_2$, and $C_1$-$C_3$ gases,
wherein one or more of the first hydropyrolysis catalyst composition and the hydroconversion catalyst composition is prepared by a process comprising combining a porous support with one or more catalytically active metals selected from Group VI and/or Group VIII of the Periodic Table, thereby forming a catalyst precursor having a volatile content, and reducing the volatile content of the catalyst precursor in one or more steps, wherein at least one volatile content reduction step is performed in the presence of one or more sulfur containing compounds; and wherein the catalyst precursor does not reach calcining temperatures prior to said at least one combined volatile content reduction-sulfurizing step.

DETAILED DESCRIPTION OF THE INVENTION

Figure 1:
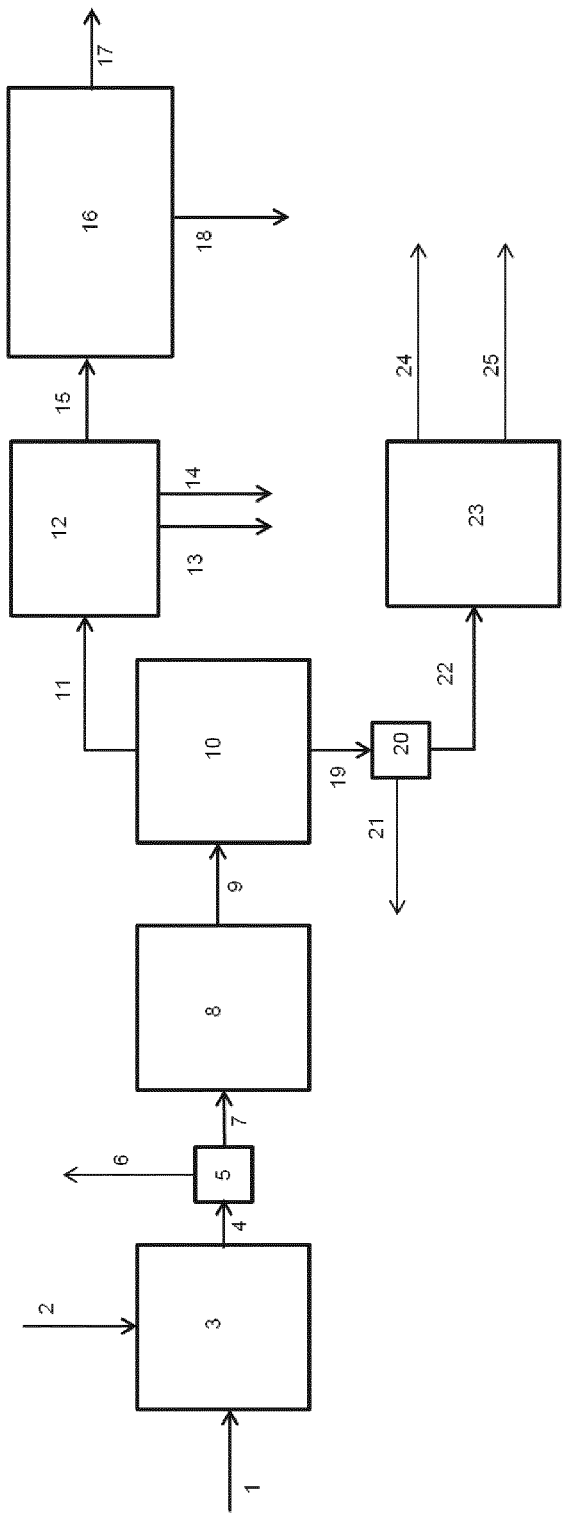
FIG. 1 shows a representation of one embodiment of the process of the invention.

The present inventors have found that an efficient and high yielding process for the conversion of a biomass-containing and/or a biomass-derived feedstock to liquid hydrocarbon can be achieved by using a process incorporating a least a step of hydropyrolysis in the presence of a hydropyrolysis catalyst composition, with this step optionally being further integrated with char and catalyst fines removal and hydroconversion in the presence of a hydroconversion catalyst composition. In the inventive process, one or both of the hydropyrolysis catalyst composition and the hydroconversion catalyst composition are prepared by combining a porous support with one or more catalytically active metals to form a catalyst precursor having a volatile content. The volatile content of the catalyst precursor is then reduced in one or more steps. At least one of the one or more volatile content reduction steps is conducted in the presence of one or more sulfur containing compounds and, prior to this volatile content reduction-sulfurizing step, the catalyst precursor is not allowed to reach calcination temperatures. Suitable such catalyst compositions include those described in WO 2000/47321 and WO 2002/32572.

The feedstock used in the inventive process contains any combination of biomass-containing and/or biomass-derived feedstock.

The term 'biomass' refers to substances derived from organisms living above the earth's surface or within the earth's oceans, rivers, and/or lakes. Representative biomass can include any plant material, or mixture of plant materials, such as a hardwood (e.g., whitewood), a softwood, a hardwood or softwood bark, lignin, algae, and/or lemna (sea weeds). Energy crops, or otherwise agricultural residues (e.g., logging residues) or other types of plant wastes or plant-derived wastes, may also be used as plant materials. Specific exemplary plant materials include corn fiber, corn stover, castor bean stalks, sugar cane bagasse, and sorghum, in addition to 'on-purpose' energy crops such as switchgrass, miscanthus, and algae. Short rotation forestry products, such as energy crops, include alder, ash, southern beech, birch, eucalyptus, poplar, willow, paper mulberry, Australian Blackwood, sycamore, and varieties of paulownia elongate. Other examples of suitable biomass include organic oxygenated compounds, such as carbohydrates (e.g., sugars), alcohols, and ketones, as well as organic waste materials, such as waste paper, construction, demolition wastes, and biosludge.

Organic oxygenated compounds of particular interest include those contained in triglyceride-containing components, for example naturally occurring plant (e.g., vegetable) oils and animal fats, or mixtures of such oils and fats (e.g., waste restaurant oils or grease). Triglyceride-containing components, which are representative of particular types of biomass, typically comprise both free fatty acids and triglycerides, with the possible additional presence of monoglycerides and diglycerides. Triglyceride-containing components may also include those comprising derivative classes of compounds such as fatty acid alkyl esters (FAAE), which embrace fatty acid methyl esters (FAME) and fatty acid ethyl esters (FAEE).

Examples of plant oils include rapeseed (including canola) oil, corn oil, colza oil, crambe oil, sunflower oil, soybean oil, hempseed oil, olive oil, linseed oil, mustard oil, palm oil, peanut oil, castor oil, coconut oil, jatropha oil, camelina oil, cottonseed oil, salicornia oil, pennycress oil, algal oil, and other nut oils, and mixtures thereof. Examples of animal fats include lard, offal, tallow, train oil, milk fat, fish oil, sewage sludge, and/or recycled fats of the food industry, including various waste streams such as yellow and brown greases. Mixtures of one or more of these animal fats and one or more of these plant oils are also representative of particular types of biomass. The triglycerides and free fatty acids of a typical plant oil, animal fat, or mixture thereof, may include aliphatic hydrocarbon chains in their structures, with the majority of these chains having from about 8 to about 24 carbon atoms. Representative plant oils and/or animal fats, used as a triglyceride-containing component, may include significant proportions (e.g., at least about 30%, or at least about 50%) of aliphatic (e.g., paraffinic or olefinic) hydrocarbon chains with 16 and 18 carbon atoms. Triglyceride-containing components may be liquid or solid at room temperature. Representative triglyceride-containing components, including plant oils and animal fats, either in their crude form or pretreated, typically have a total oxygen content of about 10-12% by weight. Solid granulated algae that is optionally dried to a low moisture content, may be a suitable type of biomass, and in particular a triglyceride-containing component, in representative embodiments.

Low-quality and/or crude triglyceride-containing components, such as brown grease, are representative of biomass. Advantageously, such triglyceride-containing components may be introduced, according to specific embodiments, directly into the hydropyrolysis reactor without pretreatment, such that the reactor itself effectively performs the required transformations that allow the products of the hydropyrolysis of such low-quality and/or crude triglyceride-containing components, to be further processed in a hydroconversion reactor in an effective manner. Representative triglyceride-containing components, for example, include those that have a total chloride or metals content, and in some cases a total alkali metal and alkaline earth metal content, of greater than about 10 ppm (e.g. from about 10 ppm to about 500 ppm), or greater than about 25 ppm (e.g. from about 25 ppm to about 250 ppm). Such levels of contaminant chloride or metals, and particularly alkali and alkaline earth metals, are detrimental to catalyst activity in many types of conventional hydroprocessing operations.

A biomass-containing feedstock may comprise all or substantially all biomass, but may also contain non-biological materials (e.g., materials derived from petroleum, such as plastics, or materials derived from minerals extracted from the earth, such as metals and metal oxides, including glass). An example of a "biomass-containing" feedstock that may comprise one or more non-biological materials is municipal solid waste (MSW).

Such municipal solid waste may comprise any combination of lignocellulosic material (yard trimmings, pressure-treated wood such as fence posts, plywood), discarded paper and cardboard, food waste, textile waste, along with refractories such as glass, metal. Prior to use in the process of this invention, municipal solid waste may be optionally converted, after removal of at least a portion of any refractories, such as glass or metal, into pellet or briquette form. Co-processing of MSW with lignocellulosic waste is also envisaged. Certain food waste may be combined with sawdust or other material and, optionally, pellitised prior to use in the process of the invention.

Another specific example of a biomass-containing feedstock comprises biomass, as described herein, in addition to one or more oxygenated polymers (e.g., plastics) that contain oxygen in the functional groups of their repeating monomeric substituents. The oxygen is at least partly removed in deoxygenation reactions occurring in the hydropyrolysis and/or hydroconversion reactors of processes described herein, through the production of $H_2O$, $CO$, and/or $CO_2$. The remainder of the polymeric structure may be used to generate either aliphatic or aromatic hydrocarbons in the substantially fully deoxygenated hydrocarbon product or liquid hydrocarbon fuel. Representative oxygenated plastics have an oxygen content of at least 10% by weight (e.g., in the range from about 10 to about 45% by weight), with specific examples of oxygenated plastic co-feeds being polycarbonates (e.g., $(C_{15}H_{16}O_2)_n$, approx. 14% by weight O), poly(methyl methacrylate) (PMMA, $(C_5H_8O_2)_n$, approx. 32% by weight O), polyethylene terephthalate (PET, $(C_{10}H_8O_4)_n$, approx. 33% by weight O), and polyamines (e.g. $(CONH_2)_n$, approx. 36% by weight O). Due to the presence of hydrocarbon ring structures in certain oxygenated polymers (e.g. PET and polycarbonates), these oxygenated polymers may produce a relatively higher yield of aromatic hydrocarbons compared to aliphatic hydrocarbons in processes described herein, whereas other oxygenated polymers may produce a relatively higher yield of aliphatic hydrocarbons compared to aromatic hydrocarbons.

The term 'biomass-derived', for example when used in the phrase biomass-derived feedstock, refers to products resulting or obtained from the thermal and/or chemical transformation of biomass, as defined above, or biomass-containing feedstocks. Representative biomass-derived feedstocks therefore include, but are not limited to, products of pyrolysis (e.g. bio-oils), torrefaction (e.g. torrefied and optionally densified wood), hydrothermal carbonization (e.g. biomass that is pretreated and densified by acid hydrolysis in hot, compressed water), and polymerization (e.g. organic polymers derived from plant monomers). Other specific examples of biomass-derived products (e.g. for use as feedstocks) include black liquor, pure lignin, and lignin sulfonate.

Thermal and/or chemical transformation of biomass may occur in a pretreatment step prior to, or upstream of, the use of the resulting biomass-derived feedstock in processes described herein, including in a hydropyrolysis or hydroconversion step. Representative pretreating steps may use a pretreating reactor (pre-reactor), upstream of a hydropyrolysis reactor, and involve devolatilization and/or at least some hydropyrolysis of a biomass-containing feedstock. Such devolatilisation and optional hydropyrolysis may be accompanied by other, beneficial transformations, for example to reduce corrosive species content, reduce hydropyrolysis catalyst poison content (e.g. reduce sodium), and/or a reduce hydroconversion catalyst poison content. Pretreatment in a pre-reactor may be carried out in the presence of a suitable solid bed material, for example a pretreating catalyst, a sorbent, a heat transfer medium, and mixtures thereof, to aid in effecting such supplemental transformations and thereby improve the quality of the biomass-derived feedstock. Suitable solid bed materials include those having dual or multiple functions. In the case of a pretreating catalyst, those having activity for hydroprocessing of the biomass, described herein, are representative. Certain pretreated feedstocks, for example resulting or obtained from devolatilisation and/or at least some hydropyrolysis, are also biomass-derived feedstocks, whereas other pretreated feedstocks, for example resulting or obtained from classification without thermal or chemical transformation, are biomass-containing feedstocks, but not biomass-derived feedstocks.

Biomass-derived feedstocks also include products of a Biomass to Liquid (BTL) pathway, which may be products of Fischer-Tropsch (F-T) synthesis, and more specifically the products of gasification, followed by F-T synthesis. These products are generally of significantly lower quality, compared to their counterpart, paraffin-rich petroleum derived products used for fuel blending. This quality deficit results from the presence of biomass-derived aliphatic alcohols and other biomass-derived organic oxygenated byproduct compounds, as well as possibly reactive olefins, with amounts of these non-paraffinic impurities depending on the F-T catalyst system and processing conditions used. Representative total oxygen contents of F-T synthesis products, as biomass-derived feedstocks, are typically in the range from about 0.25% to about 10%, and often from about 0.5% to about 5% by weight. In addition, products of F-T synthesis, including F-T waxes, have a wide carbon number (and consequently molecular weight) distribution and very poor cold flow properties. Both of these characteristics may be improved using appropriate transformations in processes described herein, for example in the hydroconversion step, to convert F-T waxes into a paraffin-rich component, with a lower average molecular weight (and narrower molecular weight distribution) and/or with a greater degree of branching (or content of isoparaffins), in order to meet specifications for distillate fuel fractions of the substantially fully deoxygenated hydrocarbon product or liquid hydrocarbon, such as a diesel boiling range fraction and/or an aviation (e.g., jet) fuel boiling range fraction.

Gasification (e.g., non-catalytic partial oxidation) of a wide variety of carbonaceous feedstocks, including biomass as defined above, may provide the syngas used for F-T synthesis. F-T synthesis refers to a process for converting syngas, namely a mixture of CO and $H_2$, into hydrocarbons of advancing molecular weight according to the reaction:

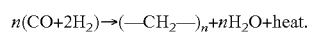

$n(CO+2H_2) \rightarrow (-CH_2-)_n + nH_2O + \text{heat}$.

The F-T synthesis reaction generates reaction products having a wide range of molecular weights, from that of methane to those of heavy paraffin waxes. The particular mixture of generally non-cyclic paraffinic and olefinic hydrocarbons, as well as the proportions of these reaction products, are governed substantially by the catalyst system used. Normally, the production of methane is minimized and a substantial portion of the hydrocarbons produced have a carbon chain length of a least 5 carbon atoms. Therefore, $C_5^+$ hydrocarbons are present in the F-T synthesis product in an amount generally of at least about 60% (e.g., from about 60% to about 99%), and typically at least about 70% (e.g. from about 70% to about 95%) by weight. The F-T synthesis product may be pretreated for the removal of light hydrocarbons (e.g., $C_1$-$C_4$ hydrocarbons) and water. However, since these components are well-tolerated in processes described herein, and are even beneficial in some cases (e.g., for the production of required hydrogen via reforming), raw products of F-T synthesis (i.e., without pretreatment) may also be suitable as biomass-derived feedstocks. Such raw products may have a combined, $C_1$-$C_4$ hydrocarbon and oxygenated hydrocarbon content of greater than about 1% by volume, and even greater than 5% by volume.

As in the case of certain F-T synthesis products, other types of crude or low-quality biomass or biomass-derived feedstocks, for example particular triglyceride-containing components such as brown grease, may be pretreated. Brown grease includes solid particulates such as rotten food particles. Crude triglyceride-containing components may otherwise include phospholipids (gums) and metal contaminants, including alkali and alkaline earth metals. Due to a high solids content, high hydroconversion catalyst poison content, and/or propensity to cause hydroconversion catalyst plugging, low-quality and/or crude triglyceride-containing components may be suitably upgraded by pretreatment to reduce the content of solids or other of these undesirable materials. A pretreated triglyceride-containing component represents a particular type of biomass-derived feedstock.

Biomass-derived feedstocks also extend to pretreated feedstocks that result or are obtained from thermal and/or chemical transformation, prior to, or upstream of, their use as feedstocks for processes described herein. Particular biomass-derived feedstocks are conventional pyrolysis oils, i.e. products of conventional pyrolysis processes, including fast pyrolysis processes as described in U.S. Pat. No. 5,961, 786, CA1283880 and by Bridgwater, A. V., 'Biomass Fast Pyrolysis' Review paper BIBLID: 0354-9836, 8 (2004), 2, 21-49). Representative biomass-derived feedstocks in which the original lignocellulosic components have been transformed may comprise a significant quantity, for example generally from about 5% to about 85%, and often from about 10% to about 75%, by weight of cyclic compounds, including cyclic organic oxygenates. The term "cyclic organic oxygenates" is meant to include compounds in which oxygen is incorporated into a ring structure (e.g., a pyran ring), as well as compounds (e.g., phenol) having a ring structure with oxygen being incorporated outside the ring structure. In either case, the ring structure may have from 3 to 8 ring members, be fused to other ring structures, and may be completely saturated (e.g., naphthenic), completely unsaturated (e.g., aromatic), or partially unsaturated. After being subjected to hydroconversion in processes described herein, these cyclic compounds, including cyclic organic oxygenates, may contribute to the total aromatic hydrocarbon content of the substantially fully deoxygenated hydrocarbon product or liquid hydrocarbon fuel. These cyclic compounds are preferably obtained from natural sources, such as lignocellulosic biomass, as described above, that has been pyrolyzed to depolymerize and fragment the cyclic building blocks of cellulose, hemicellulose, and lignin.

A representative biomass-derived feedstock is therefore conventional pyrolysis oil (bio-oil), containing significant quantities of cyclic compounds (e.g., generally from about 10% to about 90% by weight, and typically from about 20% to about 80% by weight), as described above, that are precursors, in processes described herein, to aromatic hydrocarbons. Pyrolysis oil contains often from about 30% to about 40%, by weight of total oxygen, for example in the form of both (i) organic oxygenates, such as hydroxyaldehydes, hydroxyketones, sugars, carboxylic acids, and phenolic oligomers, and (ii) dissolved water. For this reason, although a pourable and transportable liquid fuel, pyrolysis oil (and particularly raw pyrolysis oil that has not been pretreated) has only about 55-60% of the energy content of crude oil-based fuel oils. Representative values of the energy content are in the range from about 19.0 MJ/liter (69,800 BTU/gal) to about 25.0 MJ/liter (91,800 BTU/gal). Moreover, this raw product is often corrosive and exhibits chemical instability due to the presence of highly unsaturated compounds such as olefins (including diolefins) and alkenylaromatics. In processes as described herein, pyrolysis oil may be further deoxygenated and undergo other transformations to yield hydrocarbons in the substantially fully deoxygenated hydrocarbon liquid or liquid hydrocarbon fuel recovered from the hydroconversion step. According to some embodiments, aromatic hydrocarbons derived from conventional pyrolysis oil may be concentrated in a liquid product following fractionation of the substantially fully deoxygenated hydrocarbon liquid, whereby the product is suitable for blending in fuels, such as gasoline, or otherwise is useful as such a fuel without blending (e.g., a gasoline boiling range fraction meeting one or more, and possibly all, applicable gasoline specifications).

Further specific examples of biomass-derived feedstocks include byproducts of Kraft or sulfate processing for the conversion of wood into pulp. These byproducts include black liquor, tall oil, pure lignin, and lignin sulfonate. Tall oil refers to a resinous yellow-black oily liquid, which is namely an acidified byproduct of pine wood processing. Tall oil, prior to refining, is normally a mixture of rosin acids, fatty acids, sterols, high-molecular weight alcohols, and other alkyl chain materials. Distillation of crude tall oil may be used to recover a tall oil fraction (depitched tall oil) that is enriched in the rosin acids, for use as a biomass-derived feedstock that produces a relatively higher yield of aromatic hydrocarbons compared to aliphatic hydrocarbons.

Naturally derived (e.g., non-fossil derived) oils rich in cyclic compounds, and therefore useful as biomass-derived feedstocks, including pyrolysis oil, and Kraft or sulfate processing byproducts (e.g., black liquor, crude tall oil, and depitched tall oil) as described herein, have a high oxygenate content that is detrimental to their value for use as biofuels, without deoxygenation. In the case of tall oil, for example, rosin acids (all multi-ring organic acids) are present in significant concentrations. Deoxygenation of these oxygenated cyclic compounds under hydropyrolysis and/or hydroconversion conditions beneficially yields aromatic hydrocarbons. In combination with oxygen removal, ring saturation and/or ring opening of at least one ring (but not all rings) of the multi-ring compounds leads to the formation of naphthenic and/or alkylated cyclic hydrocarbons, respectively. Importantly, the naphthenic/aromatic hydrocarbon equilibrium under the particular hydropyrolysis and/or hydroconversion conditions used, may be used to govern the relative proportions of these species and thereby meet desired specifications for a particular application, for example the yield, or content, of aromatic hydrocarbons in a gasoline boiling range fraction or aviation fuel boiling range fraction of the substantially fully deoxygenated hydrocarbon product or liquid hydrocarbon, as needed to meet desired specifications (e.g. octane number in the case of gasoline specifications or aromatic hydrocarbon content in the case of aviation (non-turbine or jet) fuel specifications).

Yet further examples of biomass-derived feedstocks include oils obtained from aromatic foliage such as eucalyptols, as well as solid granulated lignin that is optionally dried to a low moisture content. These examples can also ultimately lead to the formation of aromatic hydrocarbons in the substantially fully deoxygenated hydrocarbon product or liquid hydrocarbon fuel.

Representative biomass-derived feedstocks may be pretreated to improve quality, prior to introduction into processes as described herein. Tall oil, for example, may be used either in its crude form or may otherwise be pretreated by distillation (e.g., vacuum distillation) to remove pitch (i.e., providing depitched tall oil) and/or concentrate the rosin acids, which are primarily abietic acid and dehydroabietic acid but include other cyclic carboxylic acids. A biomass-derived feedstock may in general be obtained by a pretreatment involving separation to remove unwanted materials, for example from a crude tall oil or a crude pyrolysis oil (bio-oil). In the case of crude bio-oil, for example, pretreatment by filtration and/or ion exchange may be used to remove solids and/or soluble metals, prior to introduction of the pretreated bio-oil to a process as described herein. According to other embodiments, biomass-derived feedstocks in a crude or low-quality form, such as crude bio-oil or black liquor, may also be advantageously introduced directly into processes as described herein without such pretreatment steps, such that one or more process steps (e.g., hydropyrolysis and/or hydroconversion) may itself perform the necessary pretreatment and/or desired further transformations to ultimately yield liquid hydrocarbons. In the case of a hydropyrolysis reactor performing a pretreatment step, the partially deoxygenated hydropyrolysis product, including products of the hydropyrolysis of a crude or low-quality biomass-derived feedstock, can be further processed in a hydroconversion step in an effective manner.

Any of the types of biomass-containing and biomass-derived feedstocks described herein may be combined and introduced to processes as described herein, or otherwise introduced separately, for example at differing axial positions into the hydropyrolysis and/or hydroconversion reactor. Different types of biomass-containing and/or biomass-derived feedstocks may be introduced into either the hydropyrolysis reactor or the hydroconversion reactor, although, according to particular embodiments described above, the introduction into one of these reactors (e.g., in the case of a crude or low-quality biomass-derived feedstock being introduced into the hydropyrolysis reactor vessel) may be preferable.

In one embodiment of the invention, the first hydropyrolysis catalyst composition is prepared by a process comprising combining a porous support with one or more catalytically active metals selected from Group VI and Group VIII of the Periodic Table, thereby forming a catalyst precursor having a volatile content, and reducing the volatile content of the catalyst precursor in one or more steps, wherein at least one volatile content reduction step is performed in the presence of one or more sulfur containing compounds; and wherein the catalyst precursor does not reach calcining temperatures prior to said at least one combined volatile content reduction-sulfurizing step.

In this embodiment of the invention, if hydropyrolysis is integrated with hydroconversion, the hydroconversion catalyst composition may also be prepared by a process comprising combining a porous support with one or more catalytically active metals selected from Group VI and Group VIII of the Periodic Table, thereby forming a catalyst precursor having a volatile content, and reducing the volatile content of the catalyst precursor in one or more steps, wherein at least one volatile content reduction step is performed in the presence of one or more sulfur-containing compounds; and wherein the catalyst precursor does not reach calcining temperatures prior to said at least one combined volatile content reduction-sulfurizing step. Alternatively, the hydroconversion catalyst composition may be any other suitable known hydroconversion catalyst composition known in the art, including, but not limited to, those described in co-pending applications PCT/EP2015/051709, IN 3235/CHE/2014, IN 3236/CHE/2014 and IN 3238/CHE/2014.

In another embodiment of the invention, only the hydroconversion catalyst composition is prepared by a process comprising combining a porous support with one or more catalytically active metals selected from Group VI and Group VIII of the Periodic Table, thereby forming a catalyst precursor having a volatile content, and reducing the volatile content of the catalyst precursor in one or more steps, wherein at least one volatile content reduction step is performed in the presence of one or more sulfur containing compounds; and wherein the catalyst precursor does not reach calcining temperatures prior to said at least one combined volatile content reduction-sulfurizing step.

In this embodiment of the invention, the first hydropyrolysis catalyst composition may be any other suitable known hydropyrolysis catalyst composition known in the art, including, but not limited to, those described in co-pending applications PCT/EP2015/051709, IN 3235/CHE/2014, IN 3236/CHE/2014 and IN 3238/CHE/2014.

Under the process of the present invention, a catalyst is prepared by combination of a porous support with one or more catalytically active metals to form a catalyst precursor having a volatile content. The volatile content of the catalyst precursor is then reduced in one or more steps. Volatile content reduction may take place, for example, by treating the precursor in air at temperatures below calcination temperatures, or simply by dehydrating at ambient conditions. At least one of the volatile content reduction steps is conducted in the presence of one or more sulfur containing compounds and, prior to this volatile content reduction-sulfurizing step, the catalyst precursor is not allowed to reach calcination temperatures.

The combined volatile content reduction-sulfurizing step(s) may be conducted in-situ or ex-situ. After volatile content reduction and sulfurizing is completed, the catalyst may be activated further using a liquid phase activation at elevated temperatures. For example, if ex-situ pre-sulfurizing is employed, the catalyst may be contacted with a feedstock comprising light hydrocarbons (e.g., diesel fuel) to produce a supported metal sulfide catalyst. A variety of other sulfurizing techniques may be used to produce a sulfurized catalyst and reduce solvents from the catalyst pores at the same time. No conventional high temperature calcining of the catalyst or catalyst precursor is necessary.

The catalyst undergoes a weight loss during processing as volatile compounds such as solvents and/or organic and inorganic ligands (functional coordinating groups having one or more pairs of electrons to form coordination bonds with metals) are removed. As used herein, "volatile content" shall mean weight loss as calculated following exposure of a sample to air at 482° C. for two hours: {[(sample weight before treatment)−(sample weight after treatment)]÷(sample weight before treatment)}×100.

As used herein, "catalyst precursor" means a support, which has been combined with one or more catalytically active metals, which have not yet been activated.

"Sulfurizing", when used herein, means contacting the catalyst precursor with one or more sulfur containing compounds. A "sulfurized catalyst" is a catalyst in which active metal components are converted, at least in part, to metal sulphides.

In the process of this invention, the catalyst precursor, that is a support with deposited active metals, and optionally promoters, is not calcined. For example, according to representative embodiments, the catalyst precursor, prior to its use as a sulfided catalyst in biomass conversion processes as described herein, is generally not subjected to a temperature of greater than about 300° C., typically not subjected to a temperature of greater than about 400° C., and often not subjected to a temperature of greater than about 500° C., in the absence of a sulfur containing compound or sulfurizing agent (e.g., at a concentration sufficient to convert the deposited active metals to their sulfided forms) as described below. At least one volatile content reduction step is conducted in the presence of one or more sulfur containing compounds. The volatile content of the catalyst precursor is typically no less than about 0.5%, preferably from 2% to 25%, most preferably from 6 to 10% before the catalyst precursor is exposed to the combined volatile content reduction-sulfurizing step. No calcination of the catalyst precursor is necessary or performed and, surprisingly, by not allowing the catalyst precursor to reach calcination temperatures (at least in the absence of a sulfur containing compound or sulfurizing agent), comparatively superior results are achieved in processes of the invention. The combined volatile content reduction-sulfurizing step may be done in-situ (in the reactor where the catalyst will be used) or ex-situ. Whether performed in-situ or ex-situ, this step will result the volatile content of the sulfided catalyst being reduced to generally less than 0.5% and often less than 0.1%.

A porous support is typically used to carry the catalytically reactive metal(s). For catalysts for use in the process of the present invention, supports are typically alumina, alumina-silica, silica, titania, zirconia, boria, magnesia, zeolites and combinations thereof. Porous carbon-based materials such as activated carbon and/or porous graphite can be utilized as well. The preferred supports in this invention are alumina-based and alumina-silica-based supports. Catalytically active metals typically chosen from Groups VI and/or VIII of the Periodic Table are deposited onto the support. Typically the metals are selected from molybdenum, tungsten, cobalt, nickel, and mixtures thereof. Promoters, such as phosphorous, may be used in combination with the catalytically active metals. Variations in catalyst preparation methods include impregnation, co-mulling and co-precipitation. The preferred method in this invention is impregnation, with the most preferred method being incipient wetness impregnation. The use of aqueous solutions is common; however, organic solvents such as aliphatic and aromatic hydrocarbons, alcohols, ketones, etc., can also be used to deposit soluble active components and promoters onto the support. Examples of aqueous solutions include those containing molybdates (such as di- and hepta-molybdates), molybdo- and tungsto-phosphates and silicates, polyoxometallates (such as heteropolyacids and transition metal complexes thereof), various metal chelate complexes, amine complexes, etc. The pH value of the aqueous solutions typically ranges from 1 to 12. The solution preparation techniques and methods for impregnation are well known in the art.

The catalyst precursor used in the process of the present invention may have some of its volatile content reduced in air at temperatures below calcination temperatures, including ambient conditions, or it may be moved directly to the sulfurizing step. Partial volatile content reduction to remove physically adsorbed solvents (remaining from an impregnation step) aids in transporting the catalyst should the volatile content reduction be conducted in-situ.

Without being tied to a particular theory, it is believed that the process of making the catalyst for use in the present invention controls the formation of bulky metal oxide phases in the catalyst pores by direct interaction of the catalytic metal with a sulfur containing compound below calcination temperatures, such that thermal agglomeration of the active component does not occur. As the precursor is sulfurized, sulfur compounds displace the solvent and the sulfur reacts with the metals to form highly dispersed metal sulphides before a substantial amount of bulky metal oxides can form. In the process of the invention the catalyst precursor, containing residual moisture, is exposed to a sulfur containing compound at temperatures that convert the metal precursors to catalytically active metal sulphides and drive the moisture out of the catalyst pores.

Typical in-situ sulfurization may utilize either gaseous hydrogen sulphide as a sulfurizing agent in the presence of hydrogen, or may utilize liquid-phase sulfurizing agents such as organo-sulfur compounds including alkylsulphides and polysulphides, thiols, sulfoxides, etc.

In ex-situ sulfurization, the catalyst is typically supplied to the user (refiner) in the "pre-sulphided" form where the metal oxides are converted at least in part to metal sulphides. Commercial ex-situ sulfurization processes include, for example, the ACTICAT process (CRI International Inc.) described in U.S. Pat. Nos. 5,468,372 and 5,688,736 and the SULFICAT process (Eurecat US Inc.) (ACTICAT and SULFICAT are trademarks). In the practice of the present invention, ex-situ sulfurizing is preferred.

In the present invention the known ex-situ and in-situ processes described are modified by not calcining the catalyst at high temperatures prior to contacting the catalyst with sulfur compounds. At least one of the volatile content reduction steps is conducted in the presence of one or more sulfur containing compounds. Significantly higher activity and stability of the uncalcined catalyst are achieved as compared with catalyst made by conventional processes of separate drying, calcining and sulfurizing steps. It is believed that higher activity is achieved because of higher dispersion of active components since thermal agglomeration does not occur during catalyst preparation.

Average catalyst particles sizes, for use in a commercial reactor in the hydropyrolysis step, are preferably in the range of from 0.3 mm to 4.0 mm, more preferably in the range of from 0.6 mm to 3.0 mm, and most preferably in the range of from 1 mm to 2.4 mm.

Average catalyst particles sizes, for use in a commercial reactor in the hydroconversion step, are preferably in the range of from 0.3 mm to 4.0 mm, more preferably in the range of from 0.6 mm to 3.0 mm. Preferably, the hydroconversion catalyst is used in an extruded form, for example cylindrical or as trilobes.

In the inventive process, biomass-containing and/or biomass-derived feedstock and molecular hydrogen are introduced into the hydropyrolysis reactor vessel containing the hydropyrolysis catalyst composition, in which vessel the biomass undergoes hydropyrolysis, producing an output comprising char, partially deoxygenated products of biomass hydropyrolysis liquid product, light gases ($C_1$-$C_3$ gases, $H_2O$, $CO$, $CO_2$, and $H_2$) and catalyst fines. Although any type of reactor suitable for hydropyrolysis may be employed, the preferred type of reactor is a bubbling fluidized bed reactor. The fluidization velocity, catalyst size and bulk density and biomass size and bulk density are chosen such that the catalyst remains in the bubbling fluidized bed, while the char produced gets entrained out of the reactor. The hydropyrolysis step employs a rapid heat up of the biomass feed such that the residence time of the pyrolysis vapours in the reactor vessel is preferably less than about 1 minute, more preferably less than 30 seconds and most preferably less than 10 seconds.

The biomass-containing and biomass-derived feedstocks, as described herein, encompass feedstocks that are either liquid or solid at room temperature, or otherwise a solid-liquid slurry (e.g., crude animal fats containing solids). Exemplary solid biomass-containing feedstocks and solid biomass-derived feedstocks used in the inventive process include any one of, or any combination of, solid feedstocks containing lignocellulose, feedstocks containing waste plastics, and feedstocks containing municipal solid waste that can include lignocellulosic material, waste plastics, and/or food waste. Lignocellulosic material comprises a mixture of lignin, cellulose and hemicelluloses in any proportion and usually also contains ash and moisture.

Suitable lignocellulose-containing biomass includes woody biomass and agricultural and forestry products and residues (whole harvest energy crops, round wood, forest slash, bamboo, sawdust, bagasse, sugarcane tops and trash, cotton stalks, corn stover, corn cobs, castor stalks, Jatropha whole harvest, Jatropha trimmings, de-oiled cakes of palm, castor and Jatropha, coconut shells, residues derived from edible nut production and mixtures thereof), and municipal solid wastes containing lignocellulosic material. In a preferred embodiment of the invention, woody biomass, preferably wood, is used as the source of the biomass feedstock.

The biomass feed utilized in the process of this invention may be in the form of loose biomass particles having a majority of particles preferably less than about 3.5 mm in size or in the form of a biomass/liquid slurry, in which the liquid component of the slurry may itself be a biomass-containing feedstock or biomass-derived feedstock as described herein. However, it will be appreciated by those skilled in the art that the biomass feed may be pre-treated or otherwise processed in a manner such that larger particle sizes may be accommodated. Suitable means for introducing the biomass feed into the hydropyrolysis reactor vessel include, but are not limited to, an auger, fast-moving (greater than about 5 m/sec) stream of support gas (such as inert gases and $H_2$), and constant-displacement pumps, impellers, or turbine pumps. In the most preferred embodiment of the invention, a double-screw system comprising of a slow screw for metering the biomass followed by a fast screw to push the biomass into the reactor without causing torrefaction in the screw housing is used for biomass dosing. An inert gas or hydrogen flow is maintained over the fast screw to further reduce the residence time of the biomass in the fast screw housing.

The hydropyrolysis is carried out in the hydropyrolysis reactor vessel at a temperature in the range of from 350° C. to 600° C. and a pressure in the range of from 0.50 MPa to 7.50 MPa. The heating rate of the biomass is preferably greater than about 100 W/m$^2$. The weight hourly space velocity (WHSV) in g(biomass)/g(catalyst)/hr for this step is suitably in the range of from 0.2 h$^{-1}$ to 10 h$^{-1}$, preferably in the range of from 0.3 h$^{-1}$ to 3 h$^{-1}$.

The hydropyrolysis step may operate at a temperature hotter than is typical of a conventional hydroprocessing processes familiar to those skilled in the state-of-the-art of hydrotreating and hydrocracking of petroleum-derived fractions, as a result of which the biomass is rapidly devolatilized. Thus, in a preferred embodiment, the step includes use of an active catalyst to stabilize the hydropyrolysis vapours, but not so active that it rapidly cokes.

The hydropyrolysis step of the inventive process produces a partially deoxygenated hydropyrolysis product. The term 'partially deoxygenated' is used herein to describe material in which at least 30 wt %, preferably at least 50 wt %, more preferably at least 70 wt % of the oxygen present in the original biomass-containing or biomass-derived feedstock has been removed. The extent of oxygen removal here refers to the percentage of the oxygen in the biomass feedstock (e.g., chemically bound in the lignocellulose), excluding that contained in the free moisture in the feedstock. This oxygen is removed in the form of $H_2O$, CO and $CO_2$ in the hydropyrolysis step. Although it is possible that 100 wt % of the oxygen present in the original biomass is removed, typically at most 98 wt %, suitably at most 95 wt % will be removed in the hydropyrolysis step.

In between the hydropyrolysis and hydroconversion steps, char and catalyst fines are typically removed from the partially deoxygenated hydropyrolysis product. Any ash present will normally also be removed at this stage. The most preferred method of char and catalyst fines removal from the vapour stream is by cyclone separation. Solids separation equipment (e.g. cyclones) may also be used inside the hydroprocessing reactor (above a dense bed phase) to prevent the entrainment of solid particles above a certain particle size.

Char may also be removed in accordance with the process of this invention by filtration from the vapour stream, or by way of filtering from a wash step—ebullated bed. Backpulsing may be employed in removing char from filters, as long as the hydrogen used in the process of this invention sufficiently reduces the reactivity of the pyrolysis vapours and renders the char produced free-flowing. Electrostatic precipitation, inertial separation, magnetic separation, or a combination of these technologies may also be used to remove char and catalyst fines from the hot vapour stream before further hydrofinishing, cooling and condensation of the liquid product.

In accordance with one embodiment of this invention, cyclone separation followed by hot gas filtration to remove fines not removed in the cyclones may be used to remove the char. In this case, because the hydrogen has stabilized the free radicals and saturated the olefins, the dust cake caught on the filters is more easily cleaned than char removed in the hot filtration of the aerosols produced in conventional fast pyrolysis. In accordance with another embodiment of this invention, the char and catalyst fines are removed by bubbling first stage product gas through a re-circulating liquid. The re-circulated liquid used is the high boiling point portion of the finished oil from this process and is thus a fully saturated (hydrogenated), stabilized oil having a boiling point typically above 370° C. Char or catalyst fines from the first reaction stage are captured in this liquid. A portion of the liquid may be filtered to remove the fines and a portion may be re-circulated back to the first stage hydropyrolysis reactor. One advantage of using a re-circulating liquid is that it provides a way to lower the temperature of the char-laden process vapours from the first reaction stage to the temperature desired for the second reaction stage hydroconversion step while removing fine particulates of char and catalyst. Another advantage of employing liquid filtration is that the use of hot gas filtration with its attendant, well-documented problems of filter cleaning is completely avoided.

In accordance with one embodiment of this invention, cyclone separation followed by trapping the char and catalyst fines in a high-porosity solid adsorbent bed is used to remove the char and catalyst fines from the vapour stream. Examples of high-porosity solid adsorbents suitable for trapping char and catalyst fines include CatTrap® materials available from Crystaphase.

Inert graded bed materials may also be used to remove the char and catalyst fines from the vapour stream.

In accordance with another embodiment of this invention, large-size NiMo or CoMo catalysts, deployed in an ebullated bed, are used for char removal to provide further deoxygenation simultaneous with the removal of fine particulates. Particles of this catalyst should be large, preferably in the range of from 15 to 30 mm in size, thereby rendering them easily separable from the fine char carried over from the first reaction stage, which is typically less than 200 mesh (smaller than 70 micrometers).

Any ash and catalyst fines present may also be removed in the char removal step.

After removal of the char, the partially deoxygenated hydropyrolysis product together with the $H_2$, CO, $CO_2$, $H_2O$, and $C_1$-$C_3$ gases from the hydropyrolysis step, may, if further deoxygenation of the partially deoxygenated hydropyrolysis product is desired, be introduced into a hydroconversion reactor vessel and subjected to a hydroconversion step. The hydroconversion is suitably carried out at a temperature in the range of from 300° C. to 600° C. and a pressure in the range of from 0.50 MPa to 7.50 MPa. The weight hourly space velocity (WHSV) for this step is in the range of about 0.1 $h^{-1}$ to about 2 $h^{-1}$. According to some embodiments, only the hydropyrolysis step is practiced, in order to produce the partially deoxygenated hydropyrolysis product (e.g., as a condensed liquid), which, despite being "partially" deoxygenated, may nonetheless be deoxygenated to an extent sufficient for its use as a transportation fuel or a blending component of a transportation fuel. According to other embodiments, the partially deoxygenated hydropyrolysis product, by virtue of its high stability, for example being superior to conventional bio-oils, may be stored for an extended period (e.g., at least about 1 day or at least about 30 days) and/or may be transported to a remote location (e.g., transported at least about 5 miles or transported at least about 50 miles) for further processing, including being subjected to a hydroconversion step as described herein. Alternatively, partially deoxygenated hydropyrolysis product may be stored and/or transported as described above, for the purpose of further processing in a conventional refining process, such as hydrotreating, optionally in combination with a petroleum-derived fraction (e.g., a fraction comprising diesel boiling-range hydrocarbons derived from petroleum).

The hydroconversion catalyst used in this step is typically protected, at least to a substantial degree, from Na, K, Ca, P, and other metals present in the biomass entering the hydropyrolysis reactor, which may otherwise poison the catalyst, since these metals become, to a substantial degree, physically incorporated within the solid char and ash products of the first hydropyrolysis stage, which are separated from the partially deoxygenated hydropyrolysis product, prior to subjecting this product to hydroconversion. This hydroconversion catalyst is therefore advantageously protected from olefins and free radicals by the upgrading achieved in the first reaction stage step.

After the hydroconversion step, the vapour phase product of step c) is preferably condensed to provide a liquid phase product comprising substantially fully deoxygenated C4+ hydrocarbon liquid and aqueous material. The remaining vapour phase comprises mainly $H_2$, CO, $CO_2$ and light hydrocarbon gases (typically $C_1$ to $C_3$, but this stream may also contain some $C_4$ and $C_5$ hydrocarbons) and is separated.

This remaining vapour phase may be sent to a gas clean-up system to remove $H_2S$, ammonia and trace amounts of organic sulfur-containing compounds, if present as by-products of the process. The stream containing CO, $CO_2$, $H_2$ and light hydrocarbons may then be sent to a separation, reforming and water-gas shift section of the process, wherein hydrogen is produced from the light gases and may be re-used in the process. Preferably, this process provides enough hydrogen for use in the entire process of the invention. Renewable $CO_2$ is discharged as a by-product of the process.

The liquid phase product may then be separated in order to remove the aqueous material, suitably by phase separation, and to provide the substantially fully deoxygenated C4+ hydrocarbon liquid.

The term 'substantially fully deoxygenated' is used herein to describe material in which at least 90 wt %, preferably at least 95 wt %, more preferably at least 99 wt % of the oxygen present in the original biomass-containing and/or biomass-derived feedstock has been removed. The resulting hydrocarbon liquid contains less than 2 wt %, preferably less than 1 wt %, and most preferably less than 0.1 wt % oxygen.

Suitably, the substantially fully deoxygenated C4+ hydrocarbon liquid is then subjected to further separation and purification steps in order to provide desirable products.

In one embodiment of the invention, the substantially fully deoxygenated C4+ hydrocarbon liquid is subjected to distillation in order to separate the substantially fully deoxygenated C4+ hydrocarbon liquid into fractions according to ranges of the boiling points of the liquid products contained therein. A further hydrogenation step may then be applied to all or some of these fractions for further upgrading, for example if necessary to meet transportation fuel specifications, including the ASTM requirements and/or sulfur, oxygen, and/or nitrogen levels described below.

The substantially fully deoxygenated C4+ hydrocarbon liquid comprises naphtha range hydrocarbons, middle distillate range hydrocarbons and vacuum gasoil (VGO) range hydrocarbons, which can be separated by distillation. For the purpose of clarity, middle distillates here are defined as hydrocarbons or oxygenated hydrocarbons recovered by distillation between an atmospheric-equivalent initial boiling point (IBP) and a final boiling point (FBP) measured according to standard ASTM distillation methods. ASTM D86 initial boiling point of middle distillates may vary from 150° C. to 220° C. Final boiling point of middle distillates, according to ASTM D86 distillation, may vary from 350° C. to 380° C. Naphtha is defined as hydrocarbons or oxygenated hydrocarbons having four or more carbon atoms and having an atmospheric-equivalent final boiling point that is greater than 90° C. but less than 200° C. A small amount of hydrocarbons produced in the process (typically less than 10 wt % of total C4+ hydrocarbons, preferably less than 3 wt % of total C4+ hydrocarbons and most preferably less than 1 wt % of total C4+ hydrocarbons) boil at temperatures higher than those for the middle distillates as defined above, i.e. they are hydrocarbons with boiling range similar to vacuum-gas oil produced by distillation of petroleum.

Gasoline is an automotive fuel comprising predominantly of naphtha-range hydrocarbons, used in spark-ignition internal combustion engines. In the United States, ASTM D4814 standard establishes the requirements of gasoline for ground vehicles with spark-ignition internal combustion engines.

Diesel is an automotive fuel comprising predominantly of middle-distillate range hydrocarbons, used in compression-ignition internal combustion engines. In the United States, ASTM D975 standard covers the requirements of several grades of diesel fuel suitable for various types of diesel engines.

An advantage of the present invention is that under suitable operating conditions, the substantially fully deoxygenated C4+ hydrocarbon liquid produced from the biomass-containing and/or biomass-derived feedstock, optionally following a hydrogenation or other upgrading step, may be substantially fully free from oxygen, sulfur and nitrogen. Preferably, the oxygen content of this product is less than 1.50 wt % and more preferably less than 0.50 wt %, and most preferably less than 0.10 wt %. The sulfur content is preferably less than 100 ppmw, more preferably less than 10 ppmw, and most preferably less than 5 ppmw. The nitrogen content is preferably less than 1000 ppmw, more preferably to less than 100 ppmw and most preferably to less than 10 ppmw.

DETAILED DESCRIPTION OF THE DRAWINGS

FIG. 1 shows an exemplary, but non-limiting, embodiment of the present invention.

Biomass-containing and/or biomass-derived feedstock (e.g., a solid biomass feedstock) 1 is contacted with a hydrogen-containing gaseous stream 2 in the presence of a hydropyrolysis catalyst composition in hydropyrolysis reactor vessel 3. The product 4 of this reactor is a mixed solid and vapour phase product containing hydrogen, light gases ($C_1$-$C_3$ hydrocarbons, CO, $CO_2$, $H_2S$, ammonia, water vapour), vapours of C4+ hydrocarbons and oxygenated hydrocarbons. Char, ash and catalyst fines are entrained with the vapour phase product. A solid separator 5 separates char, ash and catalyst fines 6 from the vapour phase product 7. The vapour phase product 7 then enters the catalytic hydroconversion reactor 8. This reactor is a fixed bed reactor. The product 9 of this reactor contains light gaseous hydrocarbons (methane, ethane, ethylene, propane, and propylene), naphtha range hydrocarbons, middle-distillate range hydrocarbons, hydrocarbons boiling above 370° C. (based on ASTM D86), hydrogen and by-products of the upgrading reaction such as $H_2O$, $H_2S$, $NH_3$, CO and $CO_2$. The vapours are condensed in one or more condensers followed by gas-liquid separators 10 downstream of the catalytic hydroconversion reactor 8 and a liquid product 19 is recovered.

Additionally, gas-liquid absorption in a packed bed or in a bubble column may be employed in section 10 to maximize the recovery in liquid form of hydrocarbons (predominantly C4-C5) in the gas phase. The liquid used in the absorber comprises middle-distillate range hydrocarbons and vacuum gasoil range hydrocarbons produced in the distillation section 23.

The non-condensable gases 11 are sent to a gas clean-up system 12, comprising one or more process units, to remove an $H_2S$ stream 13 and ammonia stream 14 as by-products of the process. Organic sulfur containing compounds may be removed in the gas clean-up system as well. The stream containing light hydrocarbons 15 is sent to a separation, reforming and water-gas shift section 16 of the process, where hydrogen 17 is produced from the light gases and renewable $CO_2$ is discharged as a by-product of the process 18. A fuel gas stream may be recovered as a by-product from this section as well.

The liquid product 19 recovered from the condensation and gas-liquid separation system 10 is sent to a product recovery section 20, where the aqueous product 21 is separated from the hydrocarbon liquid product 22. The hydrocarbon liquid product is then sent for distillation 23 to recover gasoline product 24 and a middle-distillate product 25. If desired, kerosene/jet fuel and diesel may be recovered as separate streams from the distillation tower.

In this process, either or both of the hydropyrolysis catalyst composition and the hydroconversion catalyst composition may be prepared by a process comprising combining a porous support with one or more catalytically active metals selected from Group VI and Group VIII of the Periodic Table, thereby forming a catalyst precursor having a volatile content, and reducing the volatile content of the catalyst precursor in one or more steps, wherein at least one volatile content reduction step is performed in the presence of one or more sulfur containing compounds; and wherein the catalyst precursor does not reach calcining temperatures prior to said at least one combined volatile content reduction-sulfurizing step.

The invention will now be illustrated by means of the following Examples, which are not intended to limit the invention. The Examples are carried out according to the process shown in FIG. 1.

Example 1 (Comparative)

S-4201 catalyst (a 1.3 mm trilobe extrudate alumina-based catalyst containing about 1 wt % Ni and commercially available from CRI Catalyst Co) was ground and sieved to a particle size range of 300 µm to 500 µm. About 127 g of this catalyst was used as the $1^{st}$ upgrading catalyst in a bubbling fluidized bed reactor 3. No catalyst was loaded in the second fixed bed reactor 8, and the effect of S-4201 alone was investigated in this test in the first stage reactor.

The biomass feedstock used was a mixture of hardwood and softwood representing a low-cost blend of available wood feeds in the upper Midwest of the United States. The feedstock was ground and sieved to a particle size range of 425 µm to 1000 µm. The catalyst in the $1^{st}$ bubbling fluidized reactor 3 was fluidized with a stream of hydrogen pre-heated to a temperature close to the reaction temperature of 415° C. After the $1^{st}$ stage catalyst had been fluidized, the biomass was introduced into the reactor and processed in a continuous manner. The rate of processing of biomass in the test was 5.11 g/min, corresponding to a weight hourly space velocity of approximately 2.3 kg biomass per kg catalyst per hour on a moisture and ash-free basis. The weighted average temperature of the fluidized bed of catalyst over the duration of biomass processing was 415° C. The biomass feedstock was converted to a mixture of char, ash and vapours in the $1^{st}$ stage. The fluidization velocity was chosen to allow the unattrited catalyst to remain in the reactor, while at least a fraction of the char and attrited catalyst were carried out of the reactor. The total hydrogen gas flow into the reactor was 72 SLPM through the test. The solid product was separated from the vapour phase product in a filter. Operating pressure for the $1^{st}$ stage reactor was 2.24 MPa(gauge).

The vapour phase product of the $2^{nd}$ stage reactor was cooled in stages to approximately −55° C. and a liquid product containing a polar phase and an apolar phase was recovered. The apolar liquid was separated from the polar liquid, and was analysed. The off gas from the process was collected and analysed on a gas chromatogram. The mass balance and carbon balance of the process was calculated from the mass and analysis of the liquid products and compositional information of the gas product, based on which the yield profile of different product classes reported in Table 2 was calculated.

It was found that the hydrocarbon liquid product had an oxygen content of 7.74 wt %. Thus, S-4201 catalyst acting in the $1^{st}$ stage alone achieved an extent of deoxygenation of about 80%. Total yield of C4+ hydrocarbon product was 24.6 wt % of the feedstock weight, on moisture and ash-free basis. The aqueous product had a pH of 8.0, and a carbon content of 0.42 wt %. The hydrogen uptake in the test was about 1.4 wt % (based on feedstock weight on MAF basis). The density of apolar liquid product was measured to be 0.98 g/mL.

The feedstock details and the yield structure of the various products for this example are summarized in Tables 1 and 2.

Example 2 (Inventive)

Catalyst B, was produced by impregnating a commercial 1.3 mm trilobe extrudate carrier (containing about 1% Ni) to make a catalyst precursor. The impregnation solution contained $CoCO_3$, $MoO_3$ and phosphoric acid. After impregnation according to methods described in U.S. Pat. No. 6,281,158, the metal contents loaded were approximately 3.8 wt % Co, 13.6 wt % Mo, 0.8 wt % Ni and 2.0 wt % P (dry basis). The catalyst precursor was air-treated at 99° C. for four hours until the volatile content was 9%. The catalyst precursor was then treated with the ACTICAT® process without employing any calcination steps to produce Catalyst B.

Catalyst B was then ground and sieved to a particle size range of 300 μm to 500 μm. The catalyst was sulfided ex-situ to convert the active metals into their sulfide form prior to use for biomass processing. About 200 g of this catalyst was used as the $1^{st}$ upgrading catalyst in a bubbling fluidized bed reactor 3. No catalyst was loaded in the second fixed bed reactor 8, and the effect of Catalyst B alone was investigated in this test in the first stage reactor.

The biomass feedstock used was a mixture of hardwood and softwood, the same feedstock as in Example 1. The feedstock was ground and sieved to a particle size range of 425 μm to 1000 μm. The catalyst in the $1^{st}$ bubbling fluidized reactor 3 was fluidized with a stream of hydrogen pre-heated to a temperature close to the reaction temperature of 412° C. After the $1^{st}$ stage catalyst had been fluidized, the biomass was introduced into the reactor and processed in a continuous manner. The rate of processing of biomass in the test was 5.06 g/min, corresponding to a weight hourly space velocity of approximately 1.44 kg biomass per kg catalyst per hour on a moisture and ash-free basis. The weighted average temperature of the fluidized bed of catalyst over the duration of biomass processing was 412° C. The biomass feedstock was converted to a mixture of char, ash and vapours in the $1^{st}$ stage. The fluidization velocity was chosen to allow the unattrited catalyst to remain in the reactor, while at least a fraction of the char and attrited catalyst were carried out of the reactor. The total hydrogen gas flow into the reactor was 72.1 SLPM through the test. The solid product was separated from the vapour phase product in a filter. Operating pressure for the $1^{st}$ stage reactor was 2.24 MPa(gauge).

The vapour phase product of the $2^{nd}$ stage reactor was cooled in stages to approximately −55° C. and a liquid product containing a polar phase and an apolar phase was recovered. The apolar liquid was separated from the polar liquid, and was analysed. The off gas from the process was collected and analysed on a gas chromatogram. The mass balance and carbon balance of the process was calculated from the mass and analysis of the liquid products and compositional information of the gas product, based on which the yield profile of different product classes reported in Table 2 was calculated.

It was found that the hydrocarbon liquid product had an oxygen content of 0.48 wt %. Thus, catalyst B acting in the $1^{st}$ stage alone achieved an extent of deoxygenation of about 98%. Total yield of C4+ hydrocarbon product was 25.1 wt % of the feedstock weight, on moisture and ash-free basis. The aqueous product had a pH of 9.0, and a carbon content of 0.29 wt %. The hydrogen uptake in the test was about 4.6 wt % (based on feedstock weight on MAF basis). The density of apolar liquid product was measured to be 0.85 g/mL.

The feedstock details and the yield structure of the various products for this example are summarized in Tables 1 and 2.

Example 3 (Inventive)

Catalyst B, as described in Example 2, was ground and sieved to a particle size range of 300 μm to 500 μm. The catalyst was sulfided ex-situ to convert the active metals into their sulfide form prior to use for biomass processing. About 210 g of the sulfided catalyst B was used as the $1^{st}$ upgrading catalyst in a bubbling fluidized bed reactor 3.

Catalyst C, was produced by impregnating a commercial 1.3 mm trilobe extrudate carrier (containing about 1% Ni) to make a catalyst precursor. The impregnation solution contained phosphomolybdic acid, $NiCO_3$ and phosphoric acid. After impregnation according to methods described in U.S. Pat. No. 6,281,158, the metal contents loaded were approximately 8 wt % Mo, 2 wt % Ni and 1 wt % P (dry basis). The catalyst precursor was air-treated below 85° C. for one hour until the volatile content was 6%. The catalyst precursor was further dehydrated and simultaneously sulfurized with the ACTICAT® process without employing any calcination steps to produce Catalyst C. Catalyst C was then used in the $2^{nd}$ stage reactor as the hydroconversion catalyst. This catalyst was loaded in the form of extrudates of approximately 1.3 mm diameter and 3-6 mm in length. The catalyst was sulfided in-situ to convert the active metals on the catalyst to their sulfide form, prior to use in the biomass conversion process. About 705 g of sulfided catalyst C was used in the test.

Wood pellets commercially available in the United States were ground and sieved to a particle size range of 0-500 μm, and the ground and sieved feedstock was used in the test. The catalyst (catalyst B) in the $1^{st}$ bubbling fluidized reactor 3 was fluidized with a stream of hydrogen pre-heated to a temperature of approximately 435° C. The second stage reactor was heated to a temperature of approximately 410.5° C. prior to introduction of biomass. After the $1^{st}$ stage catalyst had been fluidized, the biomass was introduced into the reactor and processed in a continuous manner. The rate of processing of biomass in the test was 4.74 g/min, corresponding to a weight hourly space velocity of approximately 1.26 kg biomass per kg catalyst per hour on a moisture and ash-free basis. The weighted average temperature of the fluidized bed of catalyst over the duration of biomass processing was 443.7° C. The biomass feedstock was converted to a mixture of char, ash and vapours in the $1^{st}$ stage. The fluidization velocity was chosen to allow the unattrited catalyst to remain in the reactor, while at least a fraction of the char and attrited catalyst were carried out of the reactor. The total hydrogen gas flow into the reactor was 89.6 SLPM through the test. The solid product was separated from the vapour phase product in a filter. Operating pressure for the $1^{st}$ stage reactor was 2.25 MPa(gauge).

The vapour phase product of the $2^{nd}$ stage reactor was cooled in stages to approximately −42° C. and a liquid product containing a polar phase and an apolar phase was recovered. After analysis, the polar phase was found to contain nearly exclusively water while the apolar phase was found to contain nearly exclusively C4+ hydrocarbons. The apolar liquid was separated from the polar liquid, and was analysed. The off gas from the process was continuously analysed on an online GC. The mass balance and carbon balance of the process was calculated from the mass and analysis of the liquid products and compositional information of the gas product, based on which the yield profile of different product classes reported in Table 2 was calculated.

It was found that the hydrocarbon liquid product had an oxygen content that was below the detection limit of the instrument used (below 0.01 wt %). Thus, catalyst B acting in the $1^{st}$ stage in combination with Catalyst C in the second stage achieved an extent of deoxygenation of nearly 100%. Total yield of C4+ hydrocarbon product was 26.6 wt % of the feedstock weight, on moisture and ash-free basis. The aqueous product had a pH of 9.2, and a carbon content of 0.03 wt %. The hydrogen uptake in the test was about 4.4 wt % (based on feedstock weight on MAF basis). The density of apolar liquid product was measured to be 0.837 g/mL. The operating conditions, feedstock details and the yield structure of the various products for this example are summarized in Tables 1 and 2.

Figure 2:
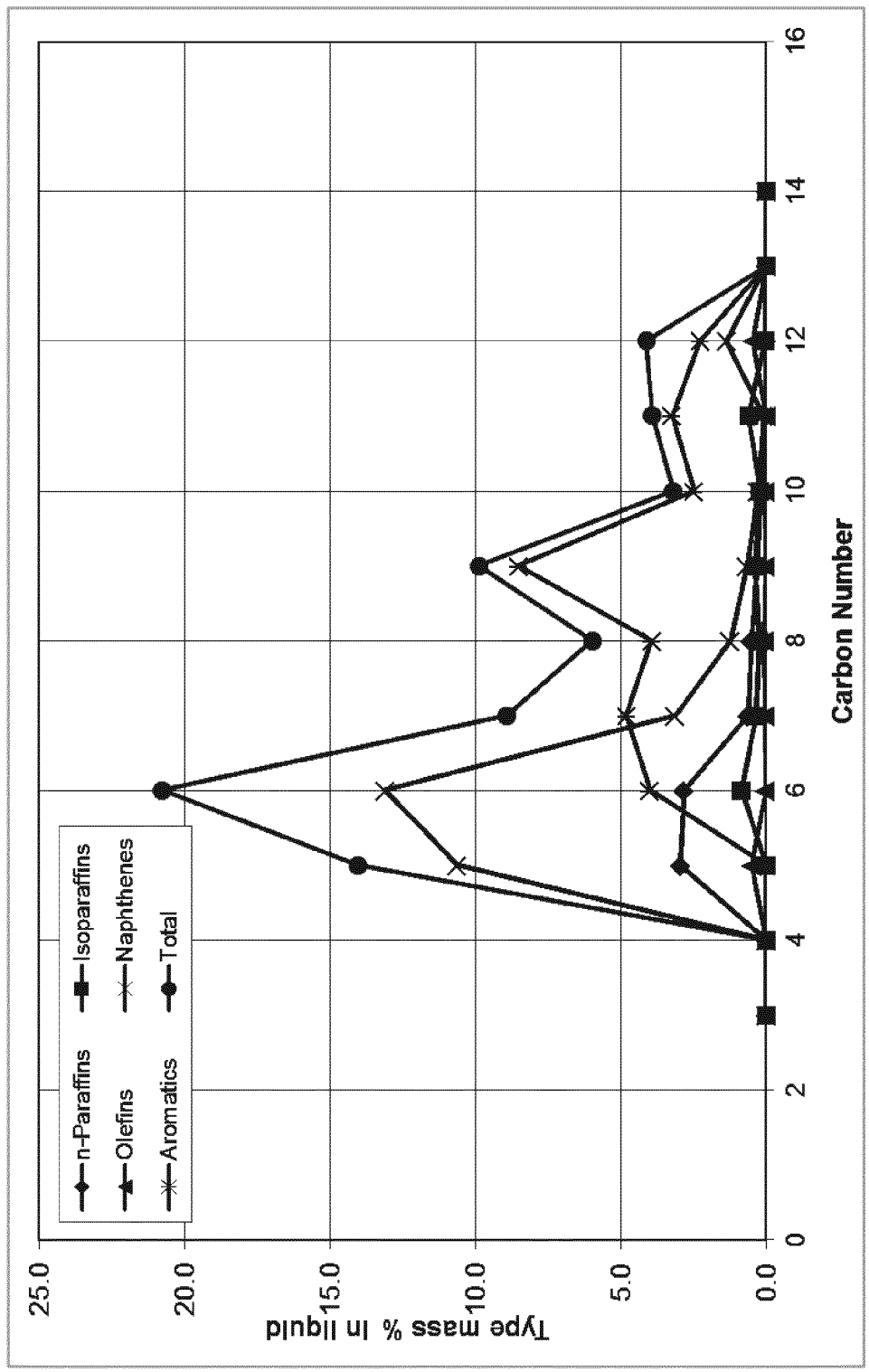
FIGS. 2 and 3 show the results of the Examples.
Figure 3:
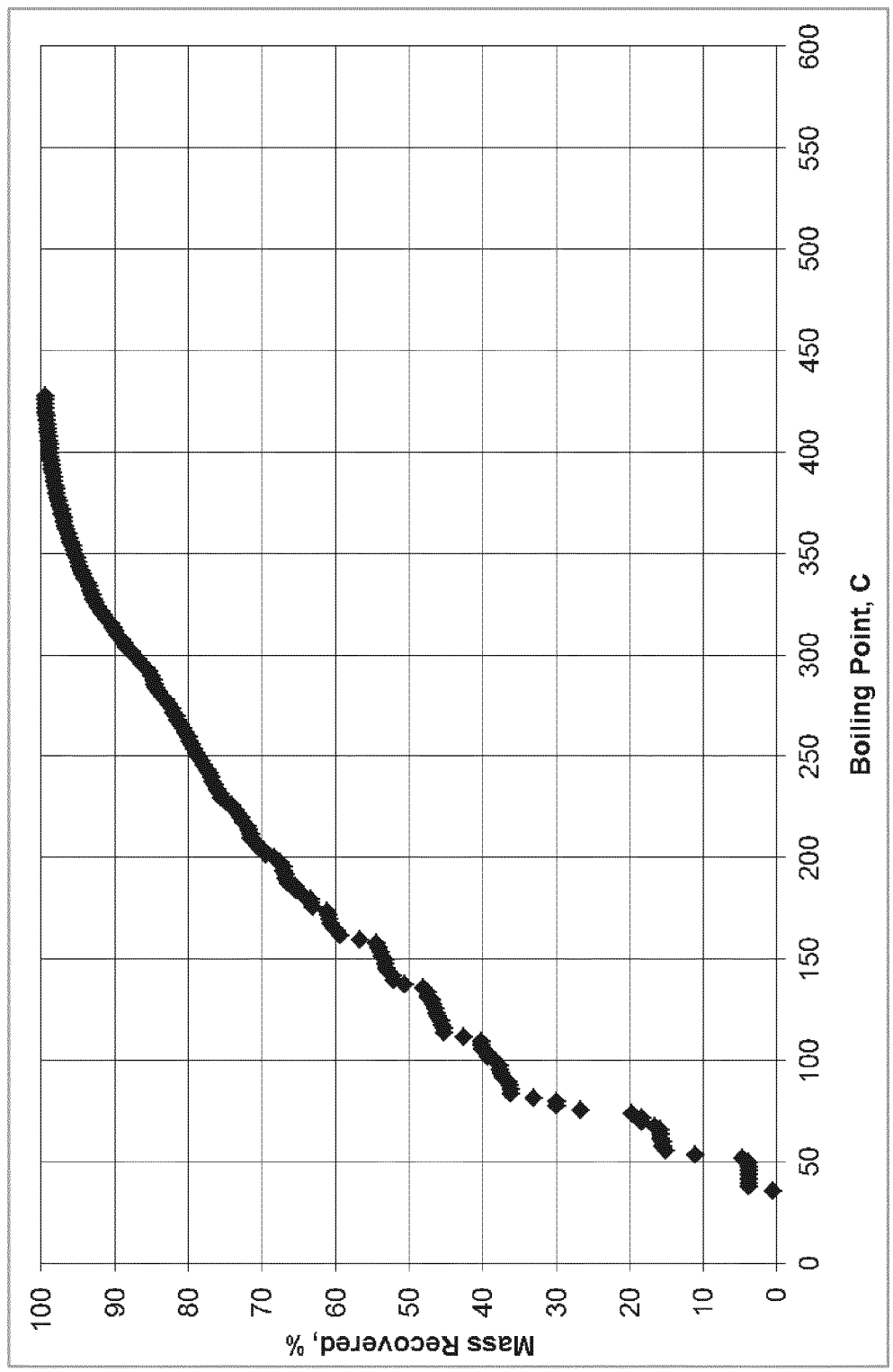

The hydrocarbon liquid collected was subjected to further detailed analysis. The detailed hydrocarbon analysis (DHA) of the hydrocarbon product (FIG. 2) showed this product to be comprised isoparaffins, naphthenes and aromatics. 6-carbon molecules were the most abundant molecules in the liquid product. SIMDIS of the hydrocarbon product (FIG. 3) showed the product to be boiling predominantly in the gasoline and diesel range, with essentially no heavy hydrocarbons (boiling above 370° C.) produced.

TABLE 1

Feedstock

|  | Example 1 | Example 2 | Example 3 |
|---|---|---|---|
| Total weight of feedstock processed, g | 633.2 | 1038.2 | 841.5 |
| Duration of feedstock processing, min | 124 | 205 | 178 |
| Feedstock Analysis | | | |
| Moisture, wt % | 4.45 | 4.6 | 6.51 |
| Ash, wt % (dry basis) | 0.55 | 0.63 | 0.34 |
| Elemental Analysis (MAF Basis)[2] | | | |
| Carbon, wt % | 49.7 | 49.7 | 47.2 |
| Hydrogen, wt % | 5.8 | 5.8 | 6.5 |
| Oxygen, wt % | 43.9 | 43.9 | 46.2 |
| Sulfur, wt % | 0.3 | 0.3 | 0.03 |
| Nitrogen, wt % | 0.11 | 0.11 | 0.027 |

TABLE 2

Products

|  | Example 1 | Example 2 | Example 3 |
|---|---|---|---|
| Yield Details | | | |
| Mass Balance Closure (% wof) | 96.6 | 104.8 | 98.4 |
| Carbon balance closure (% wof) | 93.8 | 104 | 99.0 |
| C4+ Hydrocarbon Yield (wt %, MAF) | 24.6 | 25.1 | 26.6 |
| C1-C3 Hydrocarbon Yield (wt %, MAF) | 7.4 | 15.4 | 15.1 |
| CO Yield (wt %, MAF) | 8.3 | 9.4 | 7.4 |
| $CO_2$ Yield (wt %, MAF) | 12.1 | 6.7 | 4.0 |
| Char & Ash Yield (wt %, MAF) | 19.1 | 14.0 | 8.6 |
| Water Yield (wt %, MAF) | 29.9 | 34.1 | 36.3 |
| Hydrogen added (wt %, MAF) | 1.4 | 4.6 | 4.4 |
| Condensed Hydrocarbon Liquid Analysis | | | |
| Oxygen Content (wt %) | 7.74 | 0.48 | BDL[4] |
| Density (g/mL, at 15° C.) | 0.98 | 0.85 | 0.8365 |
| Total Acid Number (TAN) | 0.5 | 0.5 | BDL[4] |
| H/C Atomic Ratio | 1.37 | 1.56 | 1.53 |
| Water Analysis | | | |
| pH | 8.0 | 9.0 | 9.2 |
| Density (g/mL, at 15° C.) | NA | NA | 1.0006 |
| Carbon Content (wt %) | 0.42 | 0.29 | 0.03 |

Notes
1. The feedstock used was ground and sieved to a sieve fraction mentioned in the details of the example.
2. MAF=moisture and ash free basis
3. NA=Not applicable or not available
4. Below Detection Limit. For oxygen analysis, detection limit is 0.01 wt %. For TAN, the detection limit is 0.01 mg KOH/g.

That which is claimed is:

1. A process for producing liquid hydrocarbon products from at least one of a biomass-containing feedstock and a biomass-derived feedstock, said process comprising the steps of:
   a) contacting the biomass-containing and/or biomass-derived feedstock with a hydropyrolysis catalyst composition and molecular hydrogen in a hydropyrolysis reactor vessel at a temperature in a range of from 350 to 600° C. and a pressure in a range of from 0.50 to 7.50 MPa, to produce a product stream comprising partially deoxygenated hydropyrolysis product, $H_2O$, $H_2$, $CO_2$, CO, $C_1$-$C_3$ gases, char and catalyst fines;
   b) removing all or a portion of the char and catalyst fines from the product stream;
   c) hydroconverting all or a portion of the partially deoxygenated hydropyrolysis product in a hydroconversion reactor vessel in the presence of one or more hydroconversion catalyst compositions and of the $H_2O$, $CO_2$, CO, $H_2$, and $C_1$-$C_3$ gases generated in step a), to produce a vapour phase product comprising substantially fully deoxygenated hydrocarbon product, $H_2O$, CO, $CO_2$, and $C_1$-$C_3$ gases,
   wherein the hydropyrolysis catalyst composition and the one or more hydroconversion catalyst compositions are a sulfurized catalyst composition comprising a porous support and one or more catalytically active metals selected from Group VI and/or Group VIII of the Periodic Table, and wherein a precursor to the sulfurized catalyst composition was subjected to at least one combined volatile content reduction-sulfurizing step and not subjected to calcination prior to the at least one combined volatile content reduction-sulfurizing step.

2. The process according to claim 1, wherein the hydropyrolysis catalyst composition and the one or more hydroconversion catalyst compositions contain different catalytically active metals.

3. The process according to claim 1, wherein the catalytically active metals are selected from molybdenum, tungsten, cobalt, nickel, and mixtures thereof.

4. The process according to claim 1, wherein a promoter is used in combination with the catalytically active metals.

5. The process according to claim 1, wherein the biomass-containing and/or biomass-derived feedstock comprises a solid selected from the group consisting of lignocellulose, waste plastics, municipal solid waste, food waste, and combinations thereof.

6. The process according to claim 5, wherein the solid is municipal solid waste containing lignocellulosic material and the biomass-containing or biomass-derived feedstock further comprises a material selected from one or more of woody biomass and agricultural and forestry products and residues thereof.

7. The process according to claim 1, further comprising condensing the vapour phase product of step c) to provide a liquid phase product comprising substantially fully deoxygenated C4+ hydrocarbon liquid and aqueous material and separating the liquid phase product from a gas phase product comprising $H_2$, CO, $CO_2$, and $C_1$-$C_3$ gases.

8. The process according to claim 7, wherein the gas phase product comprising $H_2$, CO, $CO_2$, and $C_1$-$C_3$ gases are subjected to a reforming and water-gas shift process in order to produce $H_2$.

9. The process according to claim 8, wherein the gas phase product is first purified to remove any $H_2S$, organic sulfur compounds and $NH_3$ present before being subjected to the reforming and water-gas shift process.

10. The process according to claim 8, wherein the $H_2$ produced in the reforming and water-gas shift process is used as at least a portion of the molecular hydrogen in the step a) or is added to the process in the step c).

11. A process for producing liquid hydrocarbon products from at least one of a biomass-containing feedstock and a biomass-derived feedstock, the process comprising the steps of:
  a) contacting the biomass-containing and/or biomass-derived feedstock with a hydropyrolysis catalyst composition and molecular hydrogen in a hydropyrolysis reactor vessel at a temperature in a range of from 350 to 600° C. and a pressure in a range of from 0.50 to 7.50 MPa, to produce a product stream comprising partially deoxygenated hydropyrolysis product, $H_2O$, $H_2$, $CO_2$, CO, $C_1$-$C_3$ gases, char and catalyst fines;
  b) removing all or a portion of the char and catalyst fines from the product stream;
  c) hydroconverting all or a portion of the partially deoxygenated hydropyrolysis product in a hydroconversion reactor vessel in the presence of one or more hydroconversion catalyst compositions and of the $H_2O$, $CO_2$, CO, $H_2$, and $C_1$-$C_3$ gases generated in step a), to produce a vapour phase product comprising substantially fully deoxygenated hydrocarbon product, $H_2O$, CO, $CO_2$, and $C_1$-$C_3$ gases,
  wherein the hydropyrolysis catalyst composition is a sulfurized catalyst composition comprising a porous support and one or more catalytically active metals selected from Group VI and/or Group VIII of the Periodic Table, and wherein a precursor to the sulfurized catalyst composition was subjected to at least one combined volatile content reduction-sulfurizing step and not subjected to calcination prior to the at least one combined volatile content reduction-sulfurizing step.

12. The process according to claim 11, wherein the one or more hydroconversion catalyst compositions is a sulfurized catalyst composition comprising a porous support and one or more catalytically active metals selected from Group VI and/or Group VIII of the Periodic Table, and wherein a precursor to the sulfurized catalyst composition was subjected to at least one combined volatile content reduction-sulfurizing step and not subjected to calcination prior to the at least one combined volatile content reduction-sulfurizing step.

13. The process according to claim 11, wherein the catalytically active metals are selected from molybdenum, tungsten, cobalt, nickel, and mixtures thereof.

14. The process according to claim 11, further comprising condensing the vapour phase product of step c) to provide a liquid phase product comprising substantially fully deoxygenated C4+ hydrocarbon liquid and aqueous material and separating the liquid phase product from a gas phase product comprising $H_2$, CO, $CO_2$, and $C_1$-$C_3$ gases.

15. The process according to claim 11, wherein the biomass-containing and/or biomass-derived feedstock comprises a solid selected from the group consisting of lignocellulose, waste plastics, municipal solid waste, food waste, and combinations thereof.

16. A process for producing liquid hydrocarbon products from at least one of a biomass-containing feedstock and a biomass-derived feedstock, the process comprising the steps of:
  a) contacting the biomass-containing and/or biomass-derived feedstock with a hydropyrolysis catalyst composition and molecular hydrogen in a hydropyrolysis reactor vessel at a temperature in a range of from 350 to 600° C. and a pressure in a range of from 0.50 to 7.50 MPa, to produce a product stream comprising partially deoxygenated hydropyrolysis product, $H_2O$, $H_2$, $CO_2$, CO, $C_1$-$C_3$ gases, char and catalyst fines;
  b) removing all or a portion of the char and catalyst fines from the product stream;
  c) hydroconverting all or a portion of the partially deoxygenated hydropyrolysis product in a hydroconversion reactor vessel in the presence of one or more hydroconversion catalyst compositions and of the $H_2O$, $CO_2$, CO, $H_2$, and $C_1$-$C_3$ gases generated in step a), to produce a vapour phase product comprising substantially fully deoxygenated hydrocarbon product, $H_2O$, CO, $CO_2$, and $C_1$-$C_3$ gases,
  wherein the one or more hydroconversion catalyst compositions is a sulfurized catalyst composition comprising a porous support and one or more catalytically active metals selected from Group VI and/or Group VIII of the Periodic Table, and wherein a precursor to the sulfurized catalyst composition was subjected to at least one combined volatile content reduction-sulfurizing step and not subjected to calcination prior to the at least one combined volatile content reduction-sulfurizing step.

17. The process according to claim 16, wherein the catalytically active metals are selected from molybdenum, tungsten, cobalt, nickel, and mixtures thereof.

18. The process according to claim 16, further comprising condensing the vapour phase product of step c) to provide a liquid phase product comprising substantially fully deoxygenated C4+ hydrocarbon liquid and aqueous material and separating the liquid phase product from a gas phase product comprising $H_2$, CO, $CO_2$, and $C_1$-$C_3$ gases.

19. The process according to claim 16, wherein the biomass-containing and/or biomass-derived feedstock comprises a solid selected from the group consisting of lignocellulose, waste plastics, municipal solid waste, food waste, and combinations thereof.

\* \* \* \* \*